United States Patent

[11] 3,557,774

[72] Inventor  Egon Kreis
           St. Gallen, Switzerland
[21] Appl. No. 813,412
[22] Filed    Apr. 4, 1969
[45] Patented Jan. 26, 1971
[73] Assignee Kreis AG
           St. Gallen, Switzerland
           a corporation of Switzerland
[32] Priority Jan. 24, 1969
[33]          Switzerland
[31]          1113/69

[54] HEAT STORAGE DISH
    12 Claims, 1 Drawing Fig.
[52] U.S. Cl. .................................................. 126/246,
                                                    126/375
[51] Int. Cl. .......................................... A47g 23/04
[50] Field of Search ........................................ 126/375,
                                                    246

[56]            References Cited
              UNITED STATES PATENTS
2,582,735  1/1952  Alaj ............................. 126/246

2,830,576  4/1958  Torino et al. ................. 126/246

*Primary Examiner*—Frederick L. Matteson
*Assistant Examiner*—Robert A. Dua
*Attorney*—Werner W. Kleeman ABSTRACT: A heat storage dish is disclosed, such dish providing the advantages of not bursting apart as a result of excessive heating and increased interior pressure, and further complying with maximum hygienic requirements. The novel heat storage dish generally is constructed to have a heat storage plate disposed in the bottom thereof between an interior wall and an exterior wall forming an enclosed cavity or space. The novel storage dish is characterized by the feature that the heat storage plate is retained in position in such a manner that it abuts the interior wall of the dish and further defines an opening in the central area thereof. Both of the walls of the dish are connected to one another through the opening in the interior of the heat storage plate as well as on the outside or rim portion exterior of the plate. The bottom portion of the exterior wall of the heat storage dish has an annular deformable section which is upwardly displaced relative to the support plane of the dish itself, this section being delimited by two reinforced zones located between the walls within the interior and exterior points of connection.

PATENTED JAN26 1971
3,557,774
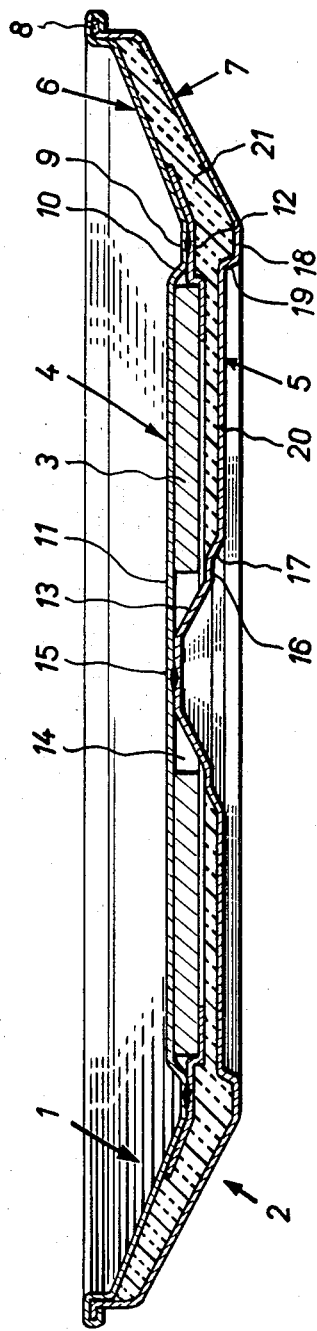
EGON KREIS — INVENTOR.
BY Jacobi & Davidson

HEAT STORAGE DISH

BACKGROUND OF THE INVENTION

This invention generally relates to heat storage dishes especially for food serving ware such as a plate, the storage dish having a heat storage plate disposed in the bottom thereof between an interior wall and an exterior wall forming an enclosed cavity or space.

In each storage bowls of known types, the interior and exterior walls are normally welded to one another at their outside ends, thus forming a double-wall dish. The heat storage plate provided for the storage dish is disposed in the bottom of the dish between the walls and the space between the walls which is not filled or taken up by the plate is filled with a heat insulation filler. In such constructions, one endeavors to make the cavity or space formed between the two walls as vacuous or free of air as possible. Yet, a certain volume of air still remains in the cavity and this cannot be prevented. Accordingly, if the heat storage dish is heated, the air enclosed in the space between the walls expands and, particularly if the dish is overheated, such expansion can cause a bulging and resulting uselessness or even a bursting apart of the dish.

So as to prevent such bursting apart of the dish, one of the walls of the dish in the prior art was provided with a small opening which could be sealed off with some material impermeable to air such as a thread. This was accomplished so as to prevent washing liquid from entering the dish when it was washed or cleaned, for example. Yet even with such construction, it was found that washing liquid could not be prevented from entering. Bacteria also would enter through the opening along with the washing liquid and such bacteria would rapidly multiply as a result of the subsequent heating of the dish. Such heating dishes are used in hospitals, for example, and it is thus obvious that the highest hygienic requirements must be met with their use and, accordingly, any structural features which would result in the formation of bacteria sources or colonies must be prevented at all cost.

SUMMARY OF THE INVENTION

Thus, a need exists in the art for the provision of a heat storage dish which obviates the drawbacks mentioned above. It is the primary object of the instant invention to provide a heat storage dish which satisfies this need. Further, more specific yet equally important objects of the instant invention are the provision of a heat storage dish which will not burst apart as a result of increased interior pressure and further which will easily meet maximum hygienic requirements.

These objects as well as other objects which will become apparent as the description proceeds, are implemented by the subject invention which comprises a heat storage dish of the type above mentioned characterized in that the heat storage plate therefor is retained in its position in such a manner that it abuts the interior wall of the dish and further, that such heat storage plate has an opening in the central area thereof. Both walls of the dish are connected to one another through this opening in the central area of the heat storage plate as well as being connected to each other on the outside relative to such plate. The bottom portion of the exterior wall of the dish is provided with an annular deformable section which is upwardly displaced relative to the support plane of the dish itself, this section being delimited by two reinforced zones located between the walls within the interior and exterior points of connection.

Accordingly, the instant inventive heat storage dish does not attempt to prevent deformation of the dish itself as was previously done and thought necessary in the prior art. Such deformation is permitted with the instant invention although great care is taken to direct the deformation within orderly limits such that even during deformation, the general usefulness and stacking capacity of the heat storage dish is fully preserved.

BRIEF DESCRIPTION OF THE DRAWINGS

The invention itself will be better understood and additional features and advantages thereof will become apparent from the following detailed description of preferred inventive embodiments, such description referring to the appended single FIG. of drawings, which FIG. depicts the heat storage dish of the instant invention in cross-sectional view.

DETAILED DESCRIPTION OF A PREFERRED INVENTIVE EMBODIMENT

Referring now to the drawing, the heat storage dish is initially to be understood as being suitable for holding food serving ware such as a plate so as to keep the food which is on the plate heated and warm. As depicted, the heat storage dish is generally constructed as a flat, circular dish or bowl. It is provided with a double-wall construction comprising an interior wall 1 and an exterior wall 2, with a heat storage plate 3 inserted therebetween. Both of the dish-shaped walls 1 and 2 have a bottom portion 4 and 5, respectively. Side portions 6 and 7, respectively, are disposed laterally adjacent to the bottom portions. The side portions generally slant in an upward and outward direction and converge towards one another. Side portion 7 of the exterior wall is vertically angled in the area of its outside end and such outside end is bent into an outwardly extending horizontal flange 8. Side portion 6 of the interior wall is likewise vertically angled in the area of its outside end and abuts with its vertically angled portion against the vertically angled portion of side portion 7. The outside end of side portion 6 is bent around flange 8 gripping underneath the latter so as to form a waterproof rim.

The bottom portion 4 of the interior wall 1 defines a narrow, horizontal circular zone 9 outwardly adjoining the side portion 6 and merging inwardly via a step 10 into an essentially horizontal main portion 11 of the bottom portion or section 4, the main portion 11 being disposed at an elevation relative to the circular zone 9. The heat storage plate 3 adjoins the underside of the main portion 11 of the bottom portion. The heat storage plate 3 is generally of circular or ring shape and extends outwardly into the vicinity of the step 10. As depicted, the heat storage plate 3 is held in place by a self-enclosed circular holding ring 12 adjoining the underside of the circular zone 9 on the bottom portion 4 and further is secured to such circular zone by spot welding or the like.

The holding ring 12 extends from the circular zone 9 both outwardly and inwardly, the portion extending outwardly from the circular zone being somewhat angled and further adjoining the underside of the side portion 6. The other portion of the holding ring which extends inwardly from the circular zone is initially angled vertically downwardly and then horizontally toward the inside and such portion forms a circular, vertical stop surface as well as a horizontal supporting surface for the heat storage plate 3. The heat storage plate 3 is thereby held in a clamped fashion between the bottom portion 4 of the interior wall 1 and the holding ring 12 and the heat storage plate thus cannot be moved either in a vertical or radial direction.

The bottom portion 5 of the exterior wall 2 is provided with a truncated cone section 13 in its central area, this section extending through the central opening 14 of the heat storage plate 3 and adjoining, with its upper flat end, the underside of bottom portion 4 of the interior wall 1. This section is secured to the underside of bottom portion 4 by means of a welding spot 15 or the like. The truncated cone section 13 is provided with a horizontal step 16 in the area of its lower end just beneath the interior delimitation of the heat storage plate 3 and such horizontal step extends into an enlarged base portion with the wall portion 17 slanting outwardly and downwardly.

The bottom portion 5 of the exterior wall 2 has a narrow horizontal circular zone 18 around its exterior circumference disposed directly beneath and at a distance from the circular zone 9 of the interior wall, which horizontal circular zone 18 outwardly adjoins the side portion 7 and inwardly adjoins the wall portion 19, such wall portion 19 slanting inwardly and upwardly. A horizontal circular section 20 is disposed between the wall portions 17 and 19 and is at a distance from the heat storage plate 3.

Circular zone 18 forms the supporting surface for the heat storage dish whereas circular zone or section 20 forms a deformable wall portion which is disposed at an elevation relative to the supporting surface, this wall portion being delimited by two reinforcement zones 16, 17 and 18, 19, respectively.

A heat insulating filler is disposed in the space between the walls 1 and 2. The exterior wall 2 is disposed at a distance from the heat storage plate 3 and is heat-insulated against such plate. If desired, heat storage plate 3 could also be disposed upon step 16 of the exterior wall.

A suitable heat insulating filler for purposes of the instant invention comprises rockwool, for example. Heat storage plate 3 preferably consists of aluminum whereas the walls 1 and 2 preferably comprise noncorrosive chromium nickel sheet steel.

Although in the described preferred embodiment of the novel heat storage dish, the remaining air enclosed in space 21 between the two walls 1 and 2 cannot escape, the dish will still not burst apart even during overheating because the deformable circular section 20 would yield to increasing pressure and thereby bulge downwardly and outwardly. Since the deformable section, in the preferred inventive embodiment, is disposed in the bottom portion of the exterior wall and further is disposed at an elevation relative to the supporting surface of the dish itself, any bulging, if and when such bulging occurs, will not detract from the appearance of the bowl nor will such bulging affect good placement of the same upon a base.

The interior wall of the heat storage dish as above described is contemplated to be continuously constructed as a single unit. However, if desired, it is also possible to construct such interior wall so as to comprise two portions in order to let the heat storage plate 3 have free upward access. These two portions would consist of a bowl or dish-shaped exterior portion covering plate 3 only at its outside edge and of a disc-shaped interior portion covering the opening of plate 3 and its inside edge area.

As should now be apparent, the objects initially set forth at the outset of this specification have been successfully achieved.

I claim:

1. A heat storage dish especially for food serving ware such as a plate, said heat storage dish comprising an interior wall and an exterior wall forming an enclosed cavity, a heat storage plate disposed between said interior wall and said exterior wall, said heat storage plate being provided with an opening, said interior and said exterior walls being joined together through said opening and at the exterior thereof relative to said heat storage plate, and means including one of said interior and exterior walls providing a deformable section for expansion.

2. A heat storage dish especially for food serving ware such as a plate, said heat storage dish comprising an interior wall and an exterior wall forming an enclosed space, a heat storage plate disposed between said interior wall and said exterior wall, said heat storage plate being maintained in position in abutting fashion against said interior wall, said heat storage plate having a central opening area, said interior wall and said exterior wall being connected to one another through said central opening area as well as on the outside thereof relative to said heat storage plate, said exterior wall displaying a bottom portion thereof having a circular, deformable section disposed at an elevation relative to the supporting plane of said heat storage dish, said deformable section being delimited by two reinforced zones disposed inside of the interior and exterior connecting points and between said interior and exterior walls.

3. A heat storage dish as defined in claim 2 wherein said deformable section is disposed in an essentially horizontal direction and is delimited at the outside thereof by a downwardly and outwardly slanting wall portion, said wall portion merging into a horizontally extending portion forming the supporting surface of said dish.

4. A heat storage dish as defined in claim 2 wherein said interior wall is provided with a bottom portion disposed in an essentially horizontal direction, said exterior wall, in the area of said central opening of said heat storage plate, defining a truncated cone section extending into said central opening, the upper end of said truncated cone section abutting said bottom portion of said interior wall, and means rigidly connecting said truncated cone section with said bottom portion of said interior wall.

5. A heat storage dish as defined in claim 4 wherein said truncated cone section has a base portion, said base portion defining the inside delimitation of said deformable section.

6. A heat storage dish as defined in claim 5 wherein said truncated cone section further has a horizontal step adjacent to its base.

7. A heat storage bowl as defined in claim 2 wherein said interior wall has a bottom portion, and wherein said bottom portions of both said interior and exterior walls merge into conically upwardly opening side portions converging towards one another, said side portions being rimmed together at their exterior ends.

8. A heat storage dish as defined in claim 2 further including a holding ring for said heat storage plate secured to the interior side of said exterior wall adjacent to the exterior delimitation of said heat storage plate, said holding ring extending freely to the inside and having an angular bend at its inside end, said angular bend abutting the bottom of said heat storage plate and providing a stop for the circumferential edge of said heat storage plate.

9. A heat storage dish as defined in claim 2 wherein said heat storage plate comprises an annular ring.

10. A heat storage dish as defined in claim 2 further including heat insulating material filled into the space between said interior and exterior walls.

11. A heat storage dish as defined in claim 10 wherein said deformable section is disposed at a distance directly beneath said heat storage plate, said deformable section having a base surface approximately of the same size as said heat storage plate.

12. A heat storage dish as defined in claim 2 wherein both said interior wall and said exterior wall consist of an essentially dish-shaped sheet metal piece.